United States Patent [19]

Koorey

[11] Patent Number: 4,738,100
[45] Date of Patent: Apr. 19, 1988

[54] BOOST-SUSTAIN-BOOST ROCKET

[75] Inventor: Alfred J. Koorey, Maitland, Fla.

[73] Assignee: Werkzeugmaschinenfabrik Oerlikon Buehrle AG, Zurich, Switzerland

[21] Appl. No.: 849,154

[22] Filed: Apr. 7, 1986

[63] Continuation-in-part of Ser. No. 678,937, Dec. 6, 1984, abandoned.

[51] Int. Cl.⁴ .................... F02K 9/00; F02K 9/08; F02K 9/70; F02K 9/72
[52] U.S. Cl. .................... 60/256; 60/253; 102/202; 102/291
[58] Field of Search .............. 60/256, 253, 254, 255, 60/39.47, 39.826, 234, 219; 102/202, 287, 288, 291

[56] References Cited

U.S. PATENT DOCUMENTS

| | | | |
|---|---|---|---|
| 3,151,447 | 10/1964 | Bornstein | 60/256 |
| 3,392,673 | 7/1968 | King | 102/202 |
| 3,707,916 | 1/1973 | Meraz, Jr. et al. | 102/202 |
| 3,951,072 | 4/1976 | Baker | 60/253 |
| 4,068,591 | 1/1978 | Betts | 60/256 |
| 4,391,196 | 7/1983 | Betts | 102/202 |

Primary Examiner—Louis J. Casaregola
Assistant Examiner—Donald E. Stout
Attorney, Agent, or Firm—Julian C. Renfro

[57] ABSTRACT

A propellant configuration for a solid propellant rocket motor, comprising a generally cylindrical housing containing a generally cylindrical main grain having a central cavity, and an igniter assembly supported in the central cavity and having means therein for bringing about combustion. At the time of actuation of the igniter assembly, hot gases are directed along flutes formed in the interior of the main grain, to cause burning thereof to take place. Advantageously, the propellant utilized in the main grain is the same as utilized in the igniter assembly, with the burn surface area of the igniter grain being in a pre-established relationship to the burn surface area of the fluted main propellant grain, such that the igniter grain will be totally consumed at the time that the flutes of the main propellant are consumed. In this way the total burn area of the main grain is reduced to a value which produces a distinct and highly desirable reduction in the total mass flow rate, this preferably occurring adjacent the end of the launch mechanism.

5 Claims, 7 Drawing Sheets

BOOST-SUSTAIN-BOOST ROCKET

CROSS-REFERENCE TO RELATED APPLICATION

This is a continuation-in-part of my co-pending application "BOOST-SUSTAIN-BOOST ROCKET MOTOR", filed Dec. 6, 1984, Ser. No. 678,937, now abandoned, and all of the pertinent teachings thereof are hereby incorporated by reference into this application.

BACKGROUND OF THE INVENTION

It is desirable at the time an air launched vehicle is being fired, for the rocket motor to quickly accelerate the missile from the launch rail or launch rack, such that a clean separation will be obtained. It is also desirable, as the missile moves ahead of the launching aircraft, for the amount of rocket exhaust, including solid particulates being ingested into the engine of the aircraft, to be minimized.

Somewhat similarly, when dealing with shoulder launched weapons, it is desirable for the pressures and particulate matter effects on the soldier be minimized, and when bringing about the firing of a canister-launched surface-to-air or surface-to-surface missile, it is most important to prevent the condensation of undesirable material on optical and laser windows.

Furthermore, in the launch of certain rocket powered missiles, it is desired to have an initial high mass flow from the rocket motor, followed by a much lower mass flow, with this then being followed by a gradually increasing mass flow until such time as a peak is reached just before motor burnout. The initial high mass flow mentioned above is obviously desirable in order for the missile to have sufficient thrust to clear the launch apparatus. However, previous attempts to attain the desired initial high mass flow usually resulted in the creation of large plumes, which were quite inconsistent with reliable acquisition of the missile by the launcher-mounted guidance equipment, with this latter problem being in addition to certain of the other factors mentioned hereinabove.

The customary approach to the goal of obtaining high initial thrust has been to resort to using a costly motor design that utilizes two different propellant formulations in order to bring about desired thrust characteristics. However, these previous attempts not only exceeded the cost budget, but also created an unusually high amount of particulate matter, that served to degrade the performance of the engine of the launching aircraft, or to jeopardize the well-being of the soldier launching a missile from his shoulder.

In addition, if a separate eject motor concept is utilized in connection with a canister-launched configuration, then the problem exists of either capturing the eject motor, with the attendant capture shock loading on the launcher, or else permitting the eject motor to follow the missile out of the canister, thereby creating a substantial amount of debris around the launcher when the missile motor is ignited.

U.S. Pat. No. 3,951,072 to Baker bears some superficial resemblance to the instant invention in that the patentee disposes an igniter in the forward end of the propellant grain, which igniter is responsible for igniting the main grain. Baker, however, teaches the configuring of his aft main motor propellant grain for the express purpose of keeping high temperature gases from coming into contact with the motor case until very late in the motor burn period. By this configuration, less inert insulative materials are needed to protect Baker's case from overheating and possibly failing under the conditions of the motor operating pressure. In the Baker device, propellant is in effect used in place of the much lower energy of insulation material, resulting in more power being generated in a given motor volume and perhaps even the same total motor weight. In general, the Baker invention simply makes a motor more efficient, i.e., more total impulse per unit weight.

Baker assuredly does not teach the configuring of the main motor grain so that a portion of it, when burned over the same time period as the igniter burn time, produces a large mass flow rate (high thrust) out of the main motor, nor after igniter burn-out does the remaining grain design produce a much lower mass flow rate (lower thrust), nor are these followed by an increasing mass flow rate (higher thrust) to propellant consumption.

Baker thus does not teach nor does he claim the radical and highly desirable change in mass flow rate that forms the bedrock of the present invention. In clear support of this position is the fact that in his Background of the Invention, Baker states " . . . resulting in improved burning with more even power distribution . . . ". That clearly represents a teaching away from the present invention.

Accordingly, it is an important goal of the instant invention to advance the state of the art by bringing about the creation of a rocket motor configuration serving to provide highly desirable thrust characteristic as well as to minimize the problems of the launching aircraft, soldier, or launch canister.

SUMMARY OF THE INVENTION

This invention represents a design advantageously combining a high mass flow rate motor igniter with a high mass flow rate main propellant grain design, thereby to produce the initial high level of total impulse required to accelerate a certain missile to a velocity of 120 feet per second within a canister length of under 7 feet.

In accordance with this advantageous new design, the use of a high mass flow rate igniter in combination with simultaneous main motor fluted grain burning is brought about to produce very high initial thrust. After igniter and main grain flutes burnout, the main grain continues to burn but at a lower thrust level, with this level progressively increasing to the point of burnout.

Quite significantly, the foregoing is accomplished utilizing the same propellant in both the igniter and the main grain.

Very close to the time of egress of the missile from its launching device, the igniter propellant is totally consumed, as are the flutes of the main grain, this resulting in a desired lowering of the thrust level. The rocket motor then burns normally in a progressive manner to produce the required missile velocity at burnout. Quite advantageously, all of the above is initiated by a single electrical signal from the launch command equipment, and accomplished within a common pressure vessel (i.e., no separate eject motor is required).

It is therefore a principal object of my invention to effectively combine a high mass flow rate igniter with a modified main grain design to produce a high mass flow for the short period of time during which the missile clears the launcher means.

It is another object of my invention to provide a desirably high mass flow-low mass flow-high mass flow characteristic for bringing about the launching of a rocket powered missile.

It is still another object of my invention to achieve the high initial mass flow necessary for a rocket missile to clear the launch device, without incurring the formation of a large plume, or the creation of undesirable particulate matter that would impair the operation of the launch equipment or personnel.

It is yet another object of my invention to provide a rocket motor design obviating the cost associated with the use of two or more different propellant formulations, or other expensive techniques.

It is yet still another object to provide a novel igniter serving the functions of igniting the main grain on command, and providing additional mass flow rate to aid in the missile ejection process.

These and other objects, features and advantages will be more apparent from a study of the appended drawings.

DETAILED DESCRIPTION

Figure 1:
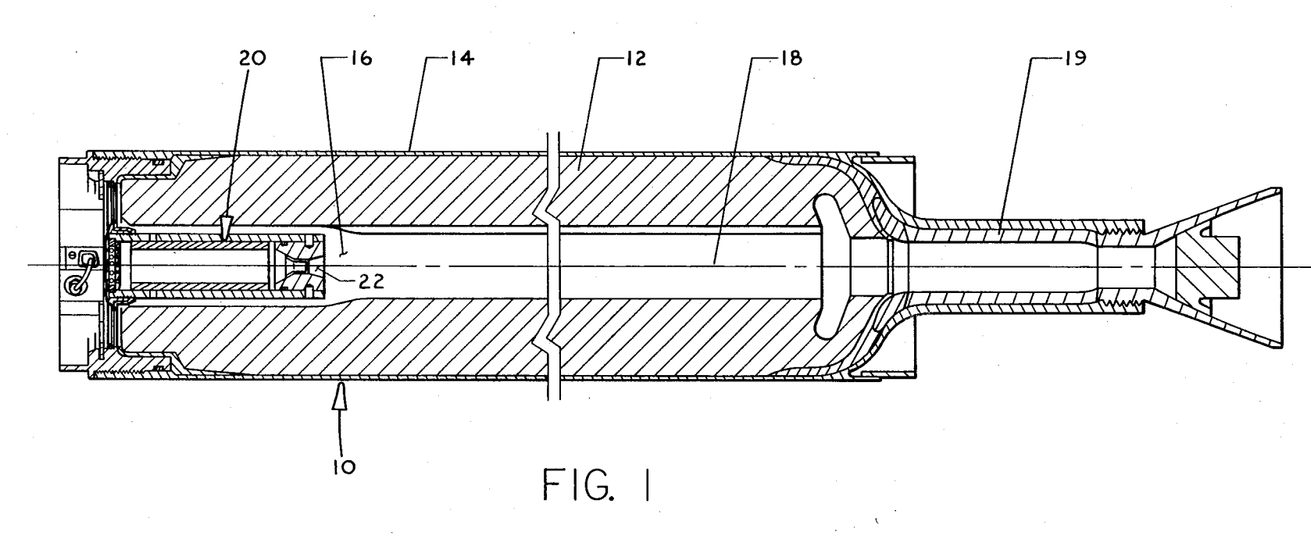
FIG. 1 is a cross sectional view of a preferred propellant configuration for a solid fuel rocket or the like, with this view revealing the mounting of an igniter assembly in the central cavity of the main grain.

Turning to FIG. 1, it will there be seen that I have illustrated certain internal portions of a rocket motor propulsion arrangement 10 in accordance with my invention, including the principal portion of solid propellant 12. The solid propellant, also known as the main grain, is generally in the configuration of a cylinder contained in a motor casing 14, of the type used in a missile. The main grain is symmetrically disposed about the longitudinal centerline 18 of the rocket motor, and has a central bore or cavity 16 therein.

The onset of burning of the main grain at the time of missile launch commences in the central cavity 16 of the propellant, with the flow of hot gases that result from the burning process traveling toward the right as viewed in FIG. 1, along the centerline 18, and out through nozzle 19. As a result, the missile travels to the left as viewed in FIG. 1. Burning of the main grain 12 is caused to commence at the desired time by the use of the igniter assembly 20, disposed in the central cavity 16, along the centerline 18.

Figure 2:
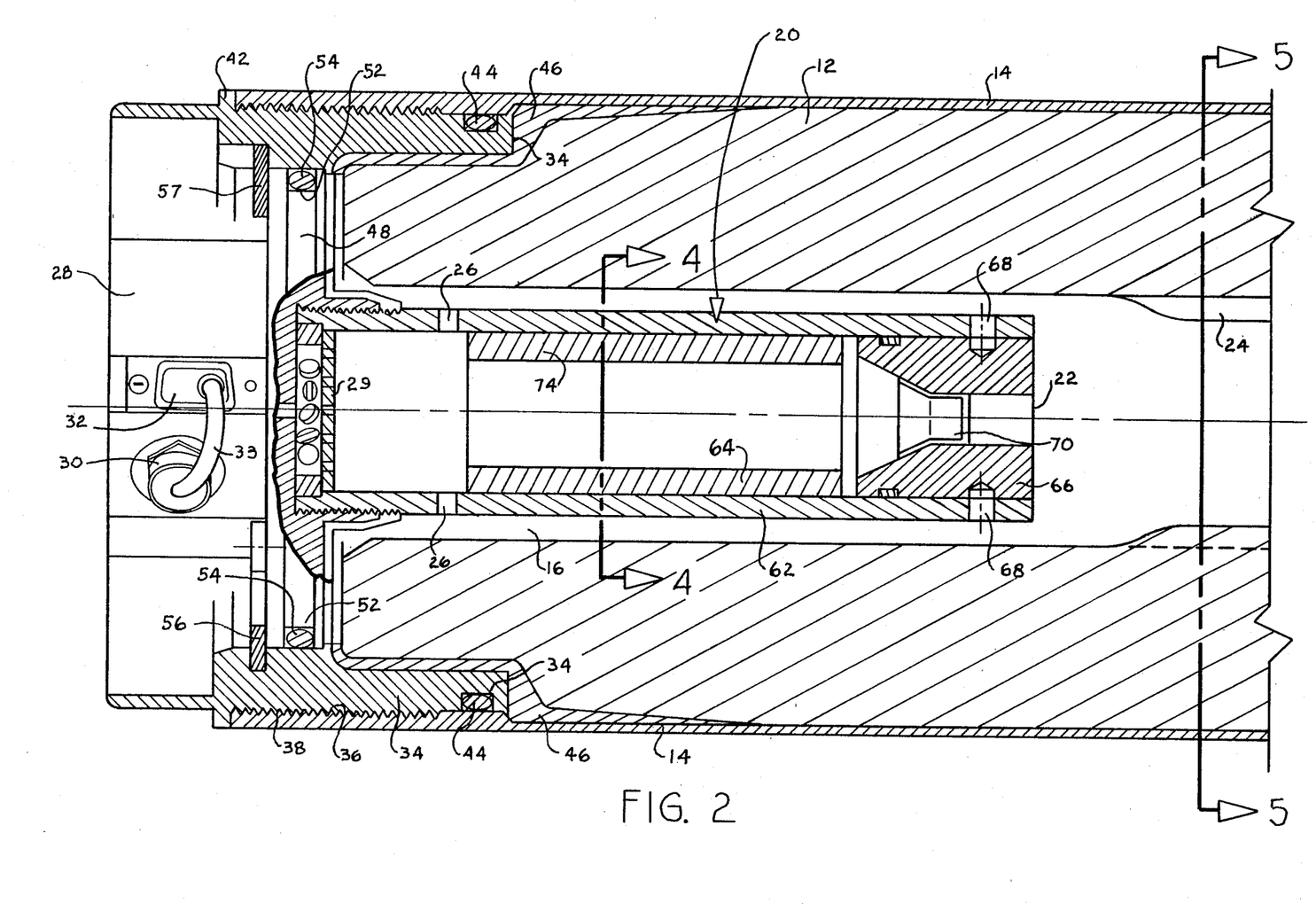
FIG. 2 is a view generally along the lines of FIG. 1, but to a larger scale, and containing significant details of the centrally mounted igniter assembly.

Turning to FIG. 2, it will there be seen that I have illustrated substantial details of the igniter assembly utilized in accordance with my invention. Shortly after the time of ignition of the igniter, hot gases are caused to emanate from the central port 22 on the aft face of the igniter, which causes the flutes 24 of the central portion of the main grain to commence burning. Hot gases also emanate from a plurality of ports or holes 26 arrayed about the forward end of the igniter, that is, the end of the igniter remote from the central port 22. These ports are preferably circumferentially spaced, and some $\frac{1}{8}$ inch in diameter, with the hot gases from these ports causing ignition of the solid propellant at the closed end of the cavity 16. Internal construction of the igniter assembly 20 will shortly be described to a fuller extent.

As will be elaborated hereinafter, the heart of my invention involves the fact that the propellant grain design of the igniter and the propellant grain design of the main grain are carefully sized so as to produce the high mass flow rate (total impulse) required to eject the missile from the launch means. After launch, the igniter propellant by design has been totally consumed, and the flutes have disappeared from the main grain, leaving only a generally cylindrical main grain configuration, having a desirable burn characteristic, for furnishing propulsion to the missile.

The igniter assembly 20 is directly supported from the safe and arm device 28, which is generally circular, and mounted on the motor casing 14 at the forward end of the main grain. The safe and arm device is designed to prevent accidental ignition of the igniter, but functions to bring about actuation of the igniter at the desired time. An initiator 30 screwed into a lower portion of the safe and arm device, and an electrical connector 32 connected thereto by electrical leads 33 make possible the firing of the igniter by means of an electrical signal provided from a remote location; note also the details in FIG. 3.

The safe and arm device I prefer to use is a conventional in-line, out-of-line barrier device serving to prevent inadvertent ignition of the motor. Since it is not per se a part of my invention, it is not illustrated herein. A safe and arm device manufactured by any of several well known companies would be sufficient in this instance.

At the time it is desired for the motor to function, an arming electrical signal is transmitted to a solenoid, causing its internal mechanism to rotate some 45 degress. A solenoid shaft extension is driven in rotation by the solenoid motion. A hole in the shaft is normally out of alignment with a pin, but upon the shaft being rotated by the solenoid action, the hole aligns with the pin.

When an electrical "fire" command is received by the initiator, combustion gases from the initiator force the pin into the hole in the shaft, thereby exposing a hole in the safe and arm housing, latter hole leading to the booster charge in the cavity in the igniter housing. I prefer to use $BKNO_3$ pellets, with the burning of such pellets causing an intense flame exiting through a perforate steel plate 29, into the igniter main cavity, this of course causing prompt ignition of the igniter propellant.

The fire command can be executed from zero to ten seconds after the solenoid has been actuated to expose the hole in the housing of the safe and arm device.

I prefer to utilize a threaded mounting ring 34 for supporting the safe and arm device 28 and the igniter assembly 20 in the illustrated locations, with ring 34 being visible in FIG. 2, and also being known as an adapter ring. The ring 34 is provided with external threads 36, which are closely received in internal threads 38 disposed around the interior of the end of the motor casing 14. A circumferential shoulder 42 is provided near the forward end of the adapter ring, and this shoulder is brought up flush with the forward flange of the motor casing during ring installation. Undesired leakage between the threads is prevented by providing a circumferential groove adjacent the rear edge of the adapter ring 34, in which groove is disposed an O-ring 44. The adapter ring 34 may be made of aluminum or the like in the interest of lightness, and integrity thereof during motor burn is assured by the use of a thermal insulator 46 serving as a protective member. The member 46 is of generally toroidal configuration, and is made of a rubber designed to withstand high temperature, such as 6000° R. for the requisite burn time, which normally is less than 5 seconds.

Figure 3:
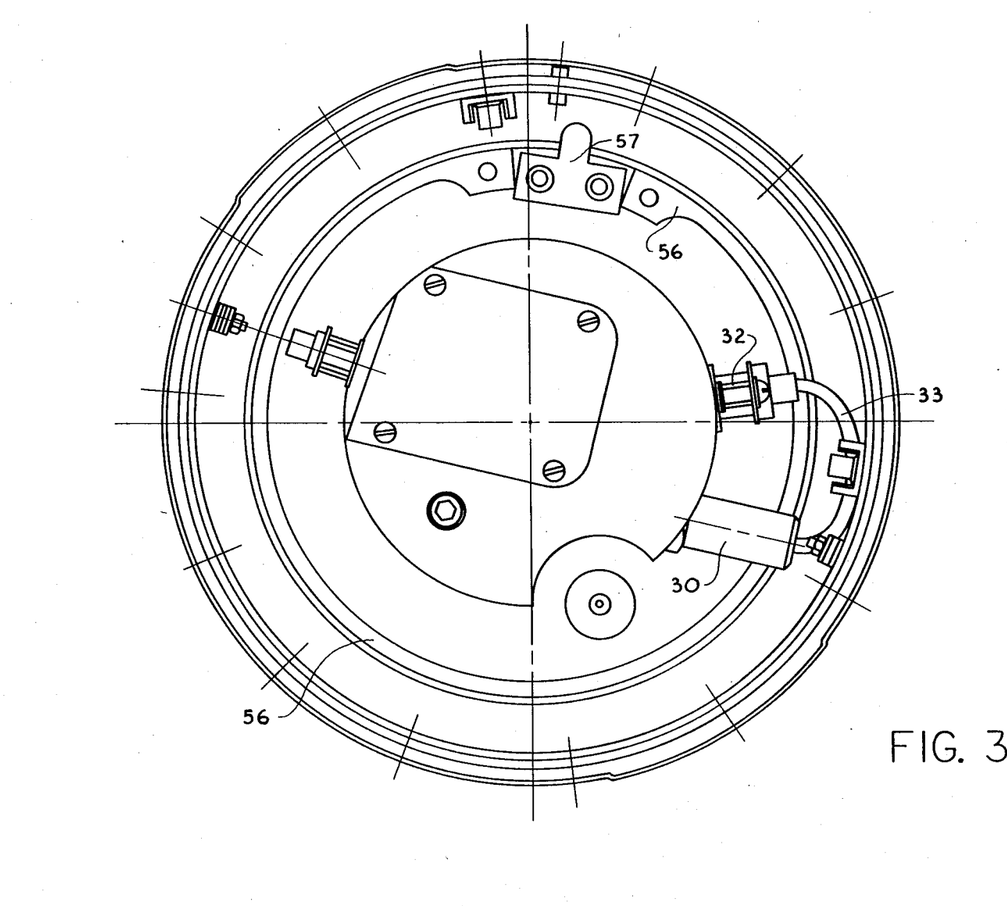
FIG. 3 is an end view of the motor assembly of FIG. 2, taken of the end remote from the nozzle.

The safe and arm device 28 is provided with a circular mounting flange 48 that is closely received in the interior bore of the adapter ring 34. The mounting flange 48 is provided with a circular exterior groove 52, in which O-ring 54 is disposed. Latter O-ring prevents high pressure, high temperature gas from flowing forwardly from the central cavity 16. Undesired movement of the flange 48 away from the illustrated position is prevented by the use of snap ring 56, received in a suitable groove in the interior bore of the adapter ring 34. I prefer to use a retaining ring key 57 that prevents the snap ring being dislodged. The key 57 is best shown in FIG. 3.

The structural details of the mounting arrangement for the igniter assembly 20 on the centerline of the central cavity 16 are presented as background information only, and no invention is believed to reside in the mounting arrangement per se.

With continued reference to FIG. 2, it will be seen that I have there illustrated certain additional details of the igniter assembly 20. The igniter serves the important functions of igniting the main grain on command, and providing the additional mass flow rate to perform the missile eject process. The generally cylindrical outer case 62 of the igniter is preferably made of high temperature resistant material such as glass phenolic, for this latter material is not appreciably damaged by the high temperature combustion taking place inside the igniter as well as around its circumference.

Interiorly of the igniter case 62 is the igniter propellant 64 which, quite importantly, is the same propellant as the main grain 12 utilized in the motor casing 14. The configuration of the propellant 64 will be discussed shortly, in connection with FIG. 4. Although I am not to be limited to any particular propellant, I prefer to use a minimum smoke, composite-modified double base propellant, inasmuch as this propellant offers high energy content per pound, the desired high burn rate, and produces a minimum quantity of smoke and plume particulates. As is known, particulates harm laser efforts by absorbing laser energy, and impact adversely the S/N ratio at the detector receivers.

It is important to note that the utilization of the same propellant in the igniter and in the main grain minimizes development costs and manufacturing costs, and enhances overall reliability.

Secured in the aft end of the generally cylindrical outer igniter case 62 is nozzle member 66, the central aperture 22 of which is preferably a generally cylindrical, non-diverging nozzle aperture as shown in FIG. 2, but if desired, the nozzle aperture can be configured as shown in FIG. 1 to produce a specific angle of igniter emitted gases, in the event is is necessary to enhance ignition of the flutes 24 of the main grain. The nozzle member is preferably made of silica-phenolic material, and is held in place in the aft end of the igniter case by the use of cement, as well as by a plurality of radially disposed pins 68. A plastic plug 70 is installed in the igniter nozzle, which serves to increase the pressure rise rate of the igniter. This in turn causes the igniter propellant to ignite faster and to burn faster, providing the high mass flow rate required of the igniter in order for the missile to properly clear the launcher. The plug 70 is blown out only at such time as pressure has built up in the interior of the igniter assembly to a desirably high value.

It is to be noted that the quantity, physical state, and the direction of the igniter-generated combustion gases emanating from the forward end of the igniter housing are controlled and properly apportioned in accordance with this invention in the radial and axial directions so as to cause simultaneous or near simultaneous ignition of the main propellant grain surface adjacent the aft end of the igniter housing, as well as along the length of the main propellant grain surface immediately adjacent the exterior of the igniter housing. This was accomplished by dividing the flow approximately evenly between radial flow and axial flow, and in the preferred embodiment, 47.3% of the total flow orifice area of the igniter housing was allocated to the three radially positioned venting ports 26 located 120° apart in the circumferential direction, and 52.7% of the total flow orifice area of the igniter housing was allocated to the single, axially positioned venting port 22. I am not to be limited, however, to this particular arrangement, nor to these percentages.

Figure 4:
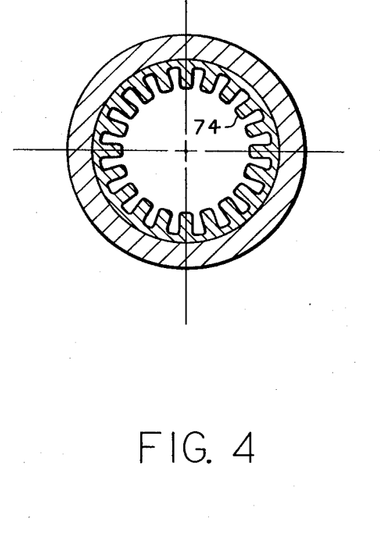
FIG. 4 is a cross sectional view of the igniter taken along lines 4—4 in FIG. 2.
Figure 5:
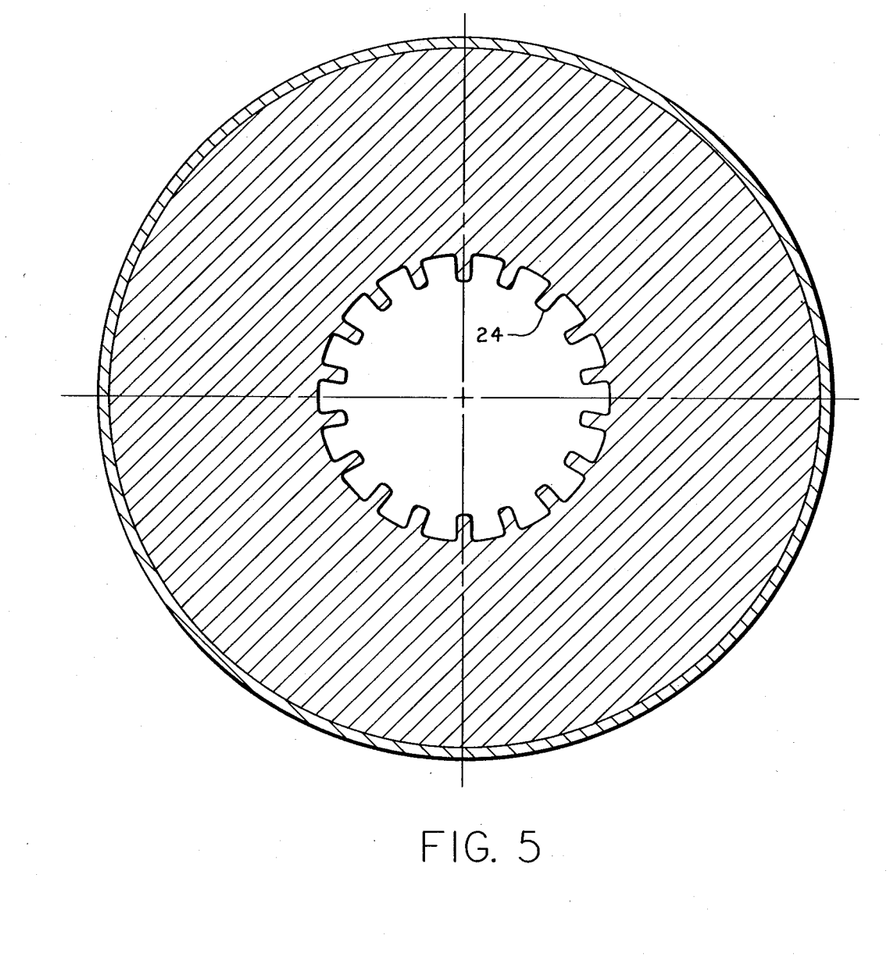
FIG. 5 is a cross sectional view of the main grain taken along lines 5—5 in FIG. 2.

Quite importantly, and as shown in FIG. 4, I provide the interior portion of propellant 64 of the igniter with a plurality of flutes 74 spaced about the centerline of the igniter. These flutes desirably increase the surface area over which intense burning can take place at the time of missile launch. Similarly, and as shown in FIG. 5, I likewise provide the central portion of the main grain with flutes 24, as was mentioned in connection with FIG. 2. As a result of the provision of the flutes 24, the burn area of the main grain is desirably increased during the relatively brief igniter burn.

The most forward location of the main propellant grain flutes are located at equal to or less than 1.0 inch from the aft end of the igniter housing 62, which reduces to acceptable limits the propensity for physical damage to the flutes 24 due to the high velocity gases emanating from the igniter housing aft aperture or port hole 22. In other words, if the flute ends were further aft of the igniter housing 62, high velocity gases from the igniter nozzle aperture could damage the flutes of the main grain, and thereby create an undesirable increase in burn surface area. The consequence of too much burn surface area would of course be too much pressure buildup in the central cavity 16.

To further preclude damage to the main propellant grain flutes by the high velocity gases emanating from the axially located aft port hole 22 of the igniter housing, the most forward edges of the main grain flutes 24 are bevelled to extend outboard at approximately a 45° angle when considered in a forward direction; note the right hand edge of FIG. 2.

The number of pounds of force against the flutes is a function of pressure in pounds per square inch multiplied by the area in square inches, and bevelling the ends of the flutes serves to decrease surface area, keeping the force against the flutes to an acceptable level, that is, a level not sufficient to cause the flutes 24 of the main grain to shear off.

It is important to note that the annular space bounded by the outside diameter of the igniter housing 62 and the inside diameter of the adjacent main propellant grain (which is flute-less in this area) along the motor length from the forward face of the main propellant grain to the aft end of the igniter housing amounts to a cross sectional area sized large enough to produce a relatively low axial velocity of the combined gases evolving from the igniter and the main grain. I choose to call this toroidally shaped area a critical flow area. This critical slow area is essential in maintaining a gas flow velocity at or below a Mach Number=0.5 (one-half sonic velocity). In the preferred embodiment, this critical flow area has a minimum cross-section of 1.75 square inches. This geometrical constraint reduces or eliminates the undesirable deleterious erosion of the main propellant grain that would have occurred if the cross sectional area of the toroidal space around the igniter was appreciably less than the critical area, for the result would then have been gas velocities higher than desirable. As is well known, higher velocity gases would mean higher mass flow per unit time, which would bring about an undesirably rapid erosion of the main grain propellant, and increase pressure in the cavity 16 to a dangerous level.

In other words, if the hot gas flow parallel to the propellant surface is too high, resulting from too small a cross-sectional area, erosivity of the main propellant grain occurs. This in turn results in higher pressures, for the propellant is burning faster, and more mass flow of gas per unit time is occurring, which can easily result in an overpressure condition, and perhaps even a catastrophic failure. In accordance with this invention I avoid this by utilizing the aforementioned critical area concept in designing the annular space around the igniter. Obviously I am not to be limited to a critical flow area of 1.75 square inch cross section, for this was mentioned by way of illustration and not limitation.

Figure 6A:
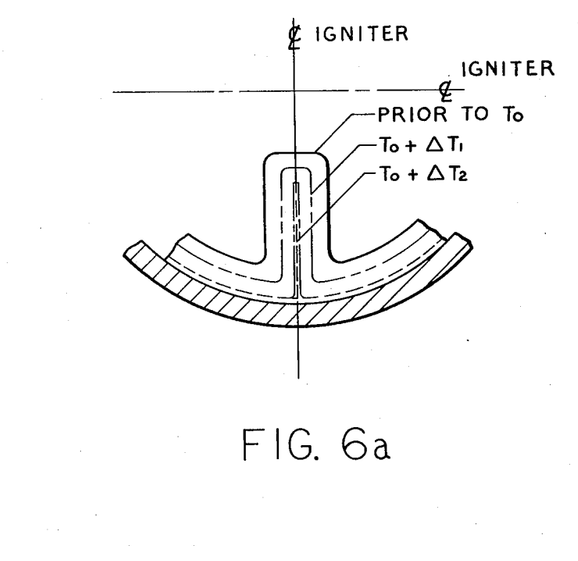
FIG. 6a is a view of a typical flute of the igniter, with the manner in which the entire igniter grain is consumed being indicated with reference to time.
Figure 6B:
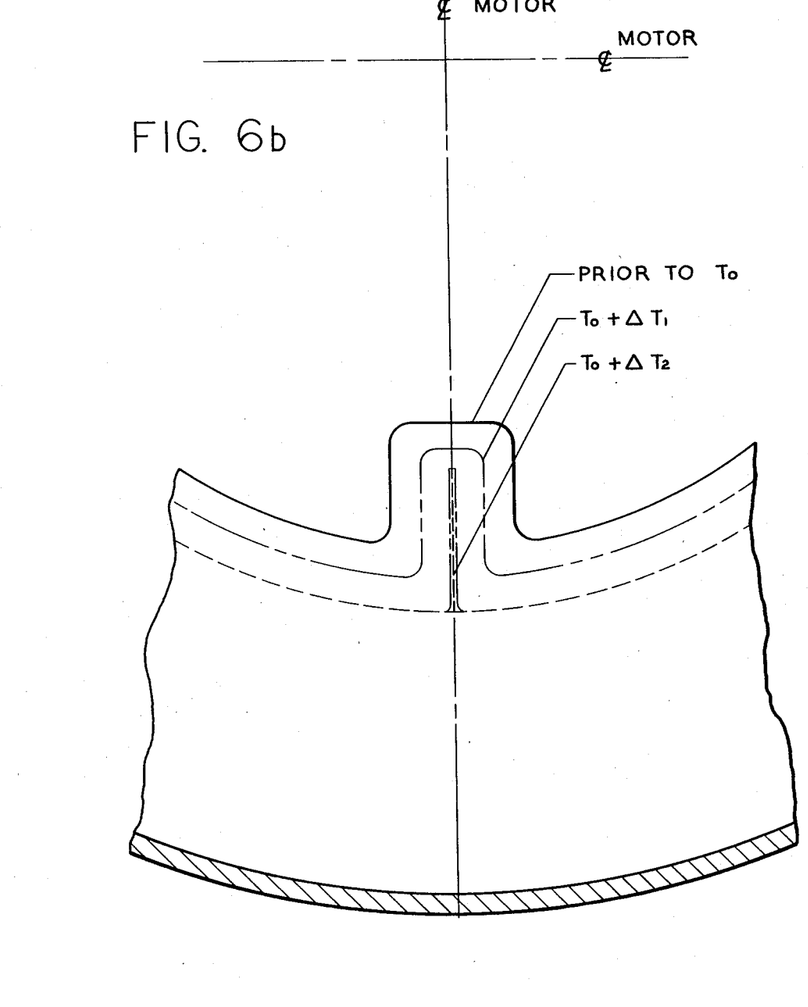
FIG. 6b is a view of a typical flute of the main grain, showing the manner in which the main grain flutes are consumed during the burning of the igniter to the same time scale.

In FIG. 6a I show to a somewhat larger scale, a typical flute of the type utilized in the igniter, with this view revealing the progressive burning thereof. It is important to note that the entire illustrated portion of the igniter has been consumed by the time the flute portion of the main grain has burned away. Similarly, in FIG. 6b I show to the same time scale, the progressive burning of a typical flute of the main grain, with it to be noted that a considerable portion of the propellant of the main grain still remains after the igniter propellant and the flutes of the main grain have burned away.

Figure 7:
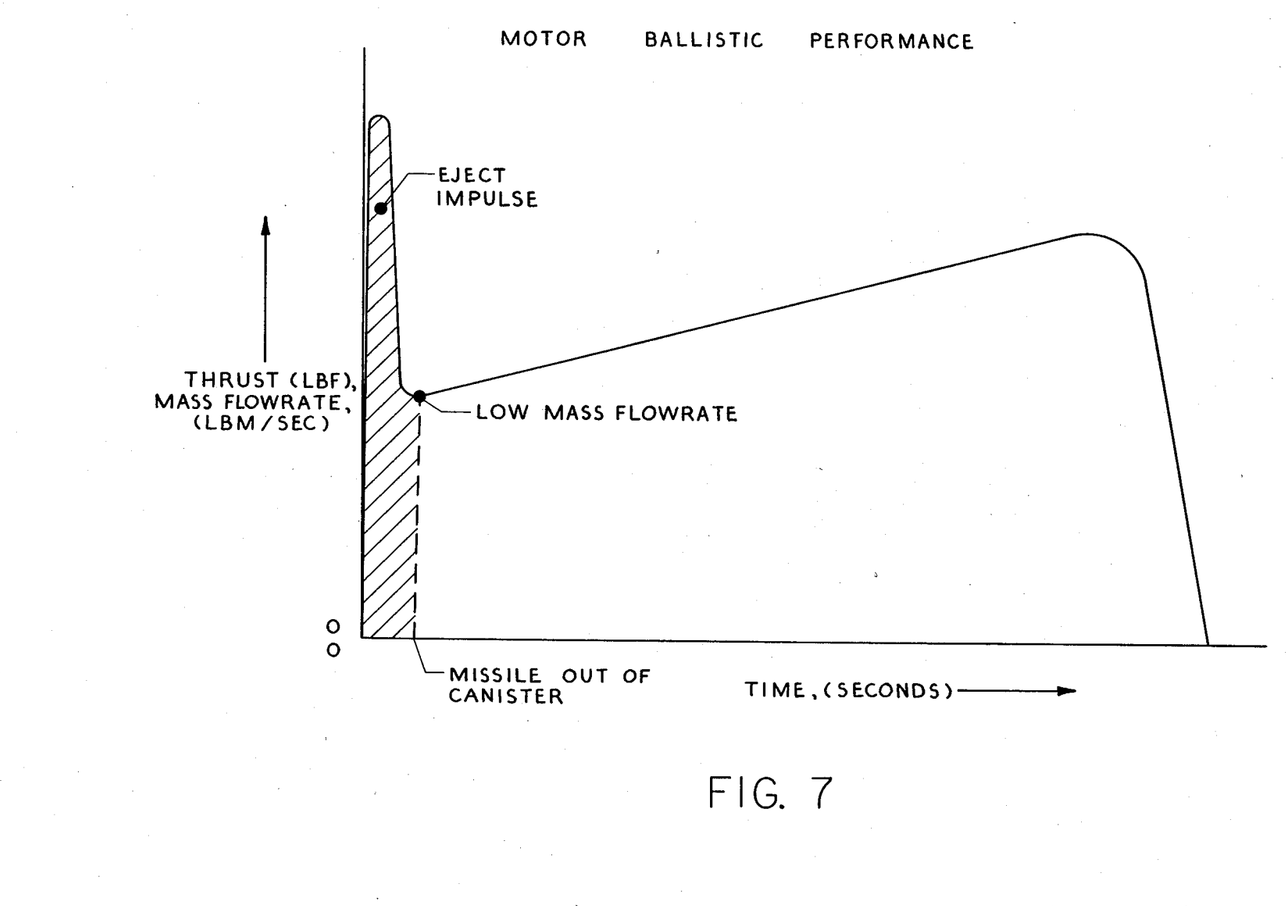
FIG. 7 is a graph of thrust plotted versus time, with this graph revealing the large initial thrust immediately followed by a sharp dropoff.

FIG. 7 represents a plot of mass flow rate versus time, with this graph clearly revealing the large initial thrust, followed after burnout of the igniter by a sharp drop to a level representing the thrust provided by main grain burning after burnaway of the flutes 24. The sharp drop usually takes place approximately 0.10 to 0.12 seconds after ignition.

Figure 8:
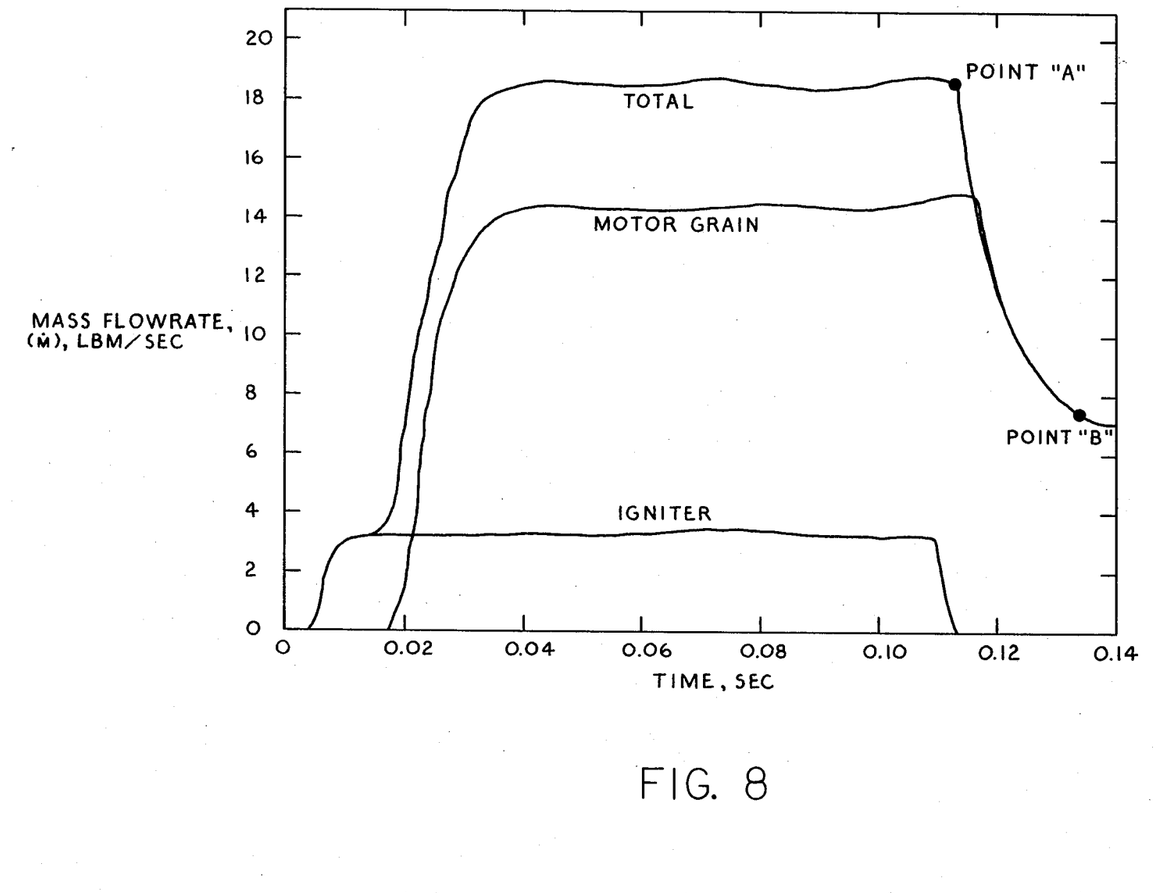
FIG. 8 is a graph generally along the lines of FIG. 7, but revealing in much greater detail, the mass flow from the igniter and from the motor grain during the first several milliseconds of burn.

FIG. 8 shows in greater detail, the interrelationship of the burn time of the flutes of the main grain, and the igniter. As will be understood from a study of this figure, the entire igniter has been consumed by the time the flutes of the main grain have burned away, with these events taking place by the time the missile leaves the launch tube.

An enhanced understanding of FIG. 8 and certain other important aspects of this invention will be achieved from a study of the following analysis.

My invention takes advantage of the classical motor internal ballistic response to a sudden change in propellant burn surface area characteristic mathematically defined as follows:

Using the standard mass balance equation:

$$\dot{\omega} = A_b \rho r = \frac{P_c A_t g}{C^*}$$

Where:
$\dot{\omega}$ = mass flow rate in lb/sec.
$A_b$ = burn surface area in in.$^2$
$\rho$ = density of propellant in lb/in.$^3$
$r$ = propellant burn rate equation
($= a P_c^n$) where
$a$ is a constant
$P_c$ is pressure in psi
$n$ is the burn rate slope
$P_c$ = operating chamber pressure in psi
$A_t$ = nozzle throat area in in.$^2$
$g$ = gravitational constant (32.147 ft/sec.$^2$)
$C^*$ = characteristic velocity in ft/sec.

By dividing the initial conditions of mass flow (immediately prior to igniter and main grain flute burnout, subscript 1) by the final conditions of mass flow (immediately after igniter and main grain flute burnout, subscript 2), $$\omega_1 = A_{b1} \rho r = \frac{P_{c1} A_{t1} g}{C^*}$$
$$\omega_2 = A_{b2} \rho r = \frac{P_{c2} A_{t2} g}{C^*}$$

The relationship between operating chamber pressure and propellant burn surface area is thus obtained. Cancelling and substituting leads to:

$$\frac{A_{b1} P_{c1}^n}{A_{b2} P_{c2}^n} = \frac{P_{c1} A_{t1}}{P_{c2} A_{t2}}$$

Assuming negligible throat erosion during the very short time period of 100 milliseconds (i.e. $A_{t2}=A_{t1}$) and re-arranging terms, the following is obtained:

$$\left[ \frac{\frac{A_{b1}}{A_{t1}}}{\frac{A_{b2}}{A_{t1}}} \right] = \left( \frac{P_{c1}}{P_{c2}} \right)^{1-n} \quad ; \quad \left[ \frac{\frac{A_{b1}}{A_{t1}}}{\frac{A_{b2}}{A_{t1}}} \right]^{\frac{1}{1-n}} = \frac{P_{c1}}{P_{c2}}$$

The geometrical design implementation of the invention may be defined as follows:

I. Main Grain Inner-Bore Geometry:

| | |
|---|---|
| Length of main grain | 32.18 inches |
| Length of flutes of main grain | 24.805 inches |
| Diameter of grain bore, average | 2.422 inches |
| Height of flutes | .244 inches |
| Average flute width | |
| Forward | .095 inches |

-continued

| | |
|---|---|
| Aft | .119 inches |

A. The burn surface area ($A_b$) of the main grain *at motor ignition* is found to be:

$$A_{b\ center\ perforate} = \text{circumference} \times \text{length} -$$
$$\text{(average width of flutex}$$
$$\text{length of flutex number of flutes)}$$
$$= [(\pi \times 2.422)32.18] - (.107 \times 24.805 \times 18)$$
$$= 197.09 \text{ in.}^2$$

$$A_{b\ flutes} = (\text{average flute width} + 2 \times \text{height}) \text{ 33 length} \times$$
$$\text{number of flutes}$$
$$= [.107 + (2 \times .244)] \times 24.805 \times 18$$
$$= 265.66 \text{ in.}^2$$

$$A_{b\ total} = A_{bc.p.} + A_{b\ flutes} = 197.09 + 265.66 = 462.75 \text{ in.}^2$$

B. The burn surface area of the main grain *immediately prior to flute burnout:*

$R_1$ = initial $R$ at motor ignition (1.211 inches) plus one half of the initial flute thickness (.107 inches)
= 1.211 + .054 = 1.265 inches $l_1$ = initial height of flute at motor ignition (.244 inches) minues one half of the initial flute thickness (.107 inches)
= .244 − .054 = .19 inches Solving for the main grain burn surface area, the following is obtained:

$A_b$ of center perforate:

$$A_{bc.p.} = \pi D_1 \times \text{Length}$$
$$= \pi(2 \times 1.265)(32.18)$$
$$= 255.77 \text{ in.}^2$$

$A_b$ of Flute:

$$A_{bF} = 2 \times l \times \text{length} \times \text{No. of Flutes}$$
$$= 2 \times .19 \times 24.805 \times 18$$
$$= 169.67 \text{ in.}^2$$

$$A_{b\ Total} = A_{bc.p.} + A_{bF} = 255.77 + 169.67 = 425.44 \text{ in.}^2$$

C. The burn surface area of the main grain *immediately after flute burnout* is found to be:

| | | |
|---|---|---|
| Inner bore diameter | = | initial dia. + burn back of 0.0535 in. on radns |
| | = | $2.422 + \left(2 \times \frac{.107}{2}\right)$ |
| | = | 2.529 in. |

-continued $$\therefore A_b = \text{circ.} \times \text{grain length}$$
$$= [\pi \times 2.529] \times 32.18$$
$$= 255.67 \text{ in}^2$$

II. Igniter Fluted Grain Configuration:

| | |
|---|---|
| Length of igniter propellant grain | 4.155 inches |
| Diameter | |
| (outside) | 1.563 inches |
| (inside) | 1.448 inches |
| Flute height | .20 inches |
| Flute thickness (average) | .130 inches |

A. The burn surface area of the igniter grain *immediately prior to motor ignition* is found to be:

$$A_b = [\pi D \times L] - [20(.130) \times L] + [(2l + .130) \times 20 \times L]$$
$$= [\pi(1.448)(4.155)] - [20(.130)(4.155)] +$$
$$[(2 \times .20 + .130) \times 20 \times 4.155]$$
$$= 18.90 - 10.80 + 44.04$$
$$= 52.143 \text{ in.}^2$$

B. The burn surface area of the igniter grain *immediately prior to igniter propellant burnout* is found to be:

$$A_b = [\pi D \times L] + [2l \times 20 \times L]$$
$$= [\pi(1.563)(4.155)] + [2(.142)(20)(4.155)]$$
$$= 20.40 + 23.60$$
$$= 44.0 \text{ in.}^2$$

C. The burn surface area of the igniter grain *immediately after igniter propellant burnout* is 0.0 IN$^2$.

Going back to the generated mathematical expression which defines the relationship between equilibrium operating pressure and burn surface area and inserting the burn surface areas for the geometric conditions *immediately prior* to igniter and main grain flute burnout ($A_{b1}$) and *immediately after* igniter and main grain flute burnout ($A_{b2}$), the following is obtained:

$$A_{b1} = A_{b\ main\ grain} + A_{b\ igniter} = (425.44) + (44.0) = 469.44 \text{ in.}^2$$

$$A_{b2} = A_{b\ main\ grain} + A_{b\ igniter} = (255.67) + (0) = 255.67 \text{ in.}^2$$

$$A_{t2} = A_{t1} = 1.507 \text{ in.}^2 \text{ (by design)}$$

$n$ (propellant burn rate exponent) = 0.33

$$\therefore \left[\frac{\frac{469.44}{1.507}}{\frac{255.67}{1.507}}\right]^{\frac{1}{1-.33}} = \frac{P_{c1}}{P_{c2}}$$

$$2.477 = \frac{P_{c1}}{P_{c2}}$$

$$P_{c2} = .404 \, P_{c1}$$

This is to the effect that the chamber operating pressure immediately *after* igniter and main grain flute burnout is 40.4 percent of the chamber operating pressure immediately *before* igniter and main grain flute burnout.

Mass flow rate (ẇ) is essentially proportional to chamber operating pressure, and motor thrust is related to operating chamber pressure via the expression $$\text{Thrust} = P_c A_t C_f$$

It is thus to be seen that I have achieved the desired significant reduction in rocket motor thrust at canister egress (approximately 100 to 140 milliseconds after motor ignition) by a novel and highly advantageous rapid reduction in propellant burn surface area, as illustrated by comparing point "A" with point "B" in FIG. 8.

I claim:

1. In a propellant configuration for a solid propellant rocket motor for missile use, in which a generally cylindrical housing contains an essentially cylindrical main propellant grain having a central cavity, in an upstream portion of which is located an igniter having propellant grain and containing means for bringing about combustion in the central cavity, and in an aft portion of which cavity a portion of the main grain is configured to form a plurality of longitudinally disposed flutes, the burn surface area of the grain in the igniter being in a pre-established relationship to the burn surface area of the longitudinally disposed flutes, the combination comprising a generally cylindrical housing containing an essentially cylindrical main propellant grain configuration having a central cavity, a plurality of distinct interior flutes formed in the main propellant grain along a portion of said central cavity, an igniter assembly utilizing the same propellant material as used in said main propellant grain and supported in a forward portion of said central cavity, said igniter assembly having an outer case of high temperature resistant material containing means for bringing about combustion, said outer case having a plurality of radially directed orifices therein, as well as at least one rearwardly directed orifice, from which hot gases can flow from said igniter assembly when it has been initiated, the flow of hot gases from said radially directed orifices being in an amount substantially equal to the amount of hot gases flowing rearwardly from said outer case, said main grain flutes being located in the immediate vicinity of the rearmost portion of said igniter assembly, with the forward portion of said flutes being beveled to preclude damage due to the flow of hot gases exiting from the rear portion of said igniter assembly, the igniter grain having been consumed by the time that the flutes of the main propellant grain have been consumed, thereby reducing the total burn area of the main grain to a value which produces a distinct and highly desirable reduction in the total motor mass flow rate adjacent the end of the launch mechanism, thus minimizing the size of the plume of exhaust gases released.

2. The propellant configuration as recited in claim 1 in which an annular space exists around the igniter assembly in a forward portion of the central cavity of said rocket motor, with the initial cross sectional area of said annular space being greater than a critical area from the standpoint of reducing gas velocity to minimize erosion of the main grain propellant, and for precluding overpressurization of said central cavity.

3. A propellant configuration for a solid propellant rocket motor for missile use, said propellant configuration comprising a generally cylindrical housing containing an essentially cylindrical main propellant grain configuration having a central cavity, a plurality of distinct interior flutes formed in the main propellant grain along an aft portion of said central cavity, an igniter assembly utilizing the same propellant material as used in said main propellant grain and supported in a forward portion of said central cavity, said igniter assembly having a generally cylindrical outer case provided with a plurality of orifices therein, said outer case being made of high temperature resistant material so as to assure integrity thereof during combustion of the propellant material initially contained in said outer case, means for bringing about combustion of the propellant material in said outer case, such that hot gases can flow from said igniter when it has been initiated, with approximately one-half of such flow of hot gases being directed substantially radially outwardly through radially directed orifices located in a forward part of said igniter assembly, onto the interior of said main propellant grain, to cause immediate burning thereof to take place, the other half of the hot gases exiting rearwardly from said outer case of said igniter and impinging upon said flutes located in the aft portion of said main grain commencing in the immediate vicinity of the rearmost portion of said igniter assembly, with the forward portion of said flutes being beveled to preclude damage due to the flow of hot gases exiting rearwardly from an orifice located in an aft part of said igniter assembly, the igniter grain having been consumed by the time that the flutes of the main propellent grain have been consumed, thereby reducing the total burn area of the main grain to a value which produces a distinct and highly desirable reduction in the total motor mass flow rate adjacent the end of the launch mechanism, thus minimizing the size of the plume of exhaust gases released.

4. The propellant configuration as recited in claim 3 in which an annular space exists around the igniter assembly in a forward portion of the central cavity of said rocket motor, with the initial cross sectional area of said annular space being greater than a critical area from the standpoint of reducing gas velocity to minimize erosion of the main grain propellant, and for precluding overpressurization of said central cavity.

5. A propellant configuration for a solid propellant rocket motor for missile use, comprising a generally cylindrical housing containing an essentially cylindrical main propellant grain configuration having a central cavity, an igniter assembly containing propellant material, supported in a forward part of said central cavity, and having means therein for bringing about combustion of such propellant material, a plurality of distinct interior flutes formed in the main propellant grain about said central cavity, commencing just aft of said igniter assembly, with forward portions of said flutes being beveled, said igniter assembly having at least one aft directed outlet port, and a plurality of radially directed outlet ports, through each of which hot gases can flow at the time the propellant material in said igniter has been initiated, approximately one-half of such flow of hot gases flowing radially outwardly from said radially directed outlet ports, such flow occurring in sufficient quantity as to create ignition of the main grain alongside substantially the entire length of said igniter assembly, with the remaining part of such flow of hot gases from said igniter assembly being directed onto the central cavity surface of the main grain, including the bevelled portions of the flutes formed in the interior of said main propellant grain aft of said igniter assembly, and serving to cause immediate burning of said flutes to take place, with the burn surface area of the igniter grain being such that a substantially lower thrust is produced at such time as the igniter grain and the flutes of the main propellant grain are totally consumed, such igniter grain having been entirely consumed by the time the flutes of the main propellant grain have been consumed, the total burn area of the main grain thus being reduced to a value which produces a distinct reduction in the total motor mass flow rate subsequent to launch, thus resulting in a desirably lessened thrust level of the motor during missile travel in close proximity to the end of the launch mechanism.

* * * * *